(12) United States Patent
Park et al.

(10) Patent No.: US 11,872,990 B2
(45) Date of Patent: Jan. 16, 2024

(54) CONTROL METHOD AND SYSTEM FOR PROTECTING CLUTCH FRICTION ELEMENTS OF AUTOMATIC TRANSMISSION AND AUTOMATIC TRANSMISSION VEHICLE INCLUDING SAME SYSTEM

(71) Applicant: HYUNDAI KEFICO CORPORATION, Gyeonggi-do (KR)

(72) Inventors: Sung-Hyun Park, Gyeonggi-do (KR); Se-Hoon Son, Gyeonggi-do (KR); John-Ha Lee, Gyeonggi-do (KR); Nam-Hoon Kim, Gyeonggi-do (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 0 days.

(21) Appl. No.: 17/717,930

(22) Filed: Apr. 11, 2022

(65) Prior Publication Data

US 2022/0324450 A1 Oct. 13, 2022

(30) Foreign Application Priority Data

Apr. 12, 2021 (KR) .......................... 10-2021-0047306

(51) Int. Cl.
*B60W 30/18* (2012.01)
*B60W 30/184* (2012.01)
(Continued)

(52) U.S. Cl.
CPC ........ *B60W 30/1843* (2013.01); *B60W 10/06* (2013.01); *B60W 10/10* (2013.01);
(Continued)

(58) Field of Classification Search
CPC .. B60W 10/06; B60W 10/10; B60W 30/1843; B60W 2510/0291;
(Continued)

(56) References Cited

U.S. PATENT DOCUMENTS

| 2014/0129066 A1* | 5/2014 | Inoue | B60W 20/40 |
| | | | 903/946 |
| 2017/0043779 A1* | 2/2017 | Yoon | B60W 10/11 |

(Continued)

FOREIGN PATENT DOCUMENTS

| JP | 2013-174310 A | 9/2013 |
| JP | 2017-67241 A | 4/2017 |

(Continued)

*Primary Examiner* — Edwin A Young
(74) *Attorney, Agent, or Firm* — Fox Rothschild LLP (57) ABSTRACT

A method and system for controlling clutch friction elements of an automatic transmission is provided. The method includes retrieving information about shift clutches from a data storage unit and acquiring information required to predict a temperature of a friction element for each shift clutch, deriving a predicted temperature value of a friction element for each shift clutch by using the information about the shift clutches and the information required to predict the temperature of the friction element, predicting whether or not overheating occurs for each shift clutch by comparing the derived predicted temperature value of the friction element for each shift clutch with an allowable temperature set for each shift clutch, and determining a target shift stage while avoiding the overheating clutch with a predicted temperature value exceeding the allowable temperature, through switching to an avoidance shift mode.

10 Claims, 3 Drawing Sheets

(51) Int. Cl.
*B60W 10/06* (2006.01)
*B60W 10/10* (2012.01)
*F16H 59/72* (2006.01)
*F16H 61/12* (2010.01)
*F16D 48/06* (2006.01)

(52) U.S. Cl.
CPC .............. *F16D 48/06* (2013.01); *F16H 59/72* (2013.01); *F16H 61/12* (2013.01); *B60W 2510/0291* (2013.01); *B60W 2510/0609* (2013.01); *B60W 2510/1005* (2013.01); *B60W 2510/107* (2013.01); *B60W 2510/108* (2013.01); *B60W 2510/1015* (2013.01); *B60W 2530/00* (2013.01); *B60W 2530/10* (2013.01); *B60W 2710/029* (2013.01); *B60W 2710/0666* (2013.01); *B60W 2710/1005* (2013.01); *F16D 2500/3024* (2013.01); *F16D 2500/30405* (2013.01); *F16D 2500/30806* (2013.01); *F16H 2059/725* (2013.01); *F16H 2061/124* (2013.01); *F16H 2061/1276* (2013.01)

(58) Field of Classification Search
CPC . B60W 2510/0609; B60W 2510/1005; B60W 2510/1015; B60W 2510/107; B60W 2510/108; B60W 2530/00; B60W 2530/10; B60W 2710/029; B60W 2710/0666; B60W 2710/1005; F16D 48/06; F16D 2500/3024; F16D 2500/30405; F16D 2500/30806; F16H 59/72; F16H 61/12; F16H 2059/725; F16H 2061/124; F16H 2061/1276
See application file for complete search history.

(56) References Cited

U.S. PATENT DOCUMENTS

2017/0120914 A1* 5/2017 Yoon .................... F16H 61/0213
2018/0312156 A1* 11/2018 Yoon ...................... B60W 10/08
2019/0001963 A1* 1/2019 Kim ...................... B60W 20/20

FOREIGN PATENT DOCUMENTS

| KR | 10-2014-0073306 A | 6/2014 |
| KR | 10-2008-0065809 | 7/2014 |
| KR | 101417085 B1 | 7/2014 |
| KR | 10-1745165 B1 | 6/2017 |
| KR | 10-2018-0121804 A | 11/2018 |
| KR | 10-2017-0055860 | 6/2021 |

\* cited by examiner

CONTROL METHOD AND SYSTEM FOR PROTECTING CLUTCH FRICTION ELEMENTS OF AUTOMATIC TRANSMISSION AND AUTOMATIC TRANSMISSION VEHICLE INCLUDING SAME SYSTEM

CROSS REFERENCE TO RELATED APPLICATION

The present application claims priority to Korean Patent Application No. 10-2021-0047306, filed on Apr. 12, 2021, the entire contents of which are incorporated herein for all purposes by this reference.

FIELD

The present disclosure relates to a control method and system for protecting clutch friction elements of an automatic transmission and, in particular, a control method and system that predicts overheating of shift clutches constituting an automatic transmission and protects the shift clutches from overheating and consequent damage or breakage through predetermined control, and an automatic transmission vehicle including the system.

BACKGROUND

In general, an automatic transmission is a mechanical device that automatically obtains an optimal gear shift in response to the driving speed and load of a vehicle. Such an automatic transmission is configured to change the shift gear stage by operating a shift solenoid and a shift clutch (hereinafter referred to as a 'clutch') under the control of a transmission control unit (TCU) that outputs a gear-shift control command according to driver's request or driving state of a vehicle.

A transmission control unit for controlling an automatic transmission uses a shift map (shift pattern) set from the relationship between the pedal depression amount of an accelerator pedal and the vehicle speed to find an optimal shift stage that matches the pedal depression amount and the vehicle speed. Then, the shift stage is set as a target shift stage and a target oil pressure (solenoid duty value) for shifting to the target shift stage is determined, and on the basis of this, a shift solenoid is controlled.

When oil is supplied to the clutch involved in the target shift stage according to the operation of the shift solenoid, the clutch is operated to the engaged side so that the target shift is realized. Here, in situations where the amount of oil supplied to the clutch is less than the required level or the torque fluctuation is large, such as in a sharp kick-down shift, excessive slip between the clutch friction elements (disk and plate) occurs, causing the clutch to be overheated or severely damaged.

Nevertheless, since the related art has no technology to prevent the overheating and consequent damage to the clutch friction elements (disk and plate) occurring due to excessive slip between the clutch friction elements in situations where the amount of oil supplied to the clutch is less than the required level or the torque fluctuation is large, such as in a sharp kick-down shift, there is a need to deal with this.

The foregoing is intended merely to aid in the understanding of the background of the present disclosure, and is not intended to mean that the present disclosure falls within the purview of the related art that is already known to those skilled in the art.

SUMMARY

In one aspect, a control method and system are provided for protecting clutch friction elements of an automatic transmission, wherein overheating of shift clutches is predicted in real time on the basis of various information collected from various parts of a vehicle, and when the overheating of a specific shift clutch is predicted, predetermined control (shift avoidance, engine torque limitation, etc.) is performed to protect the shift clutch from the overheating and damage resulting therefrom, and an automatic transmission vehicle including the control system.

In an aspect of the present disclosure, there is provided a method of controlling clutch friction elements of an automatic transmission, the method including:

(a) retrieving information about shift clutches from a data storage unit and acquiring information required to predict a temperature of a friction element for each shift clutch;

(b) deriving a predicted temperature value of a friction element for each shift clutch by using the information about the shift clutches and the information required to predict the temperature of the friction element;

(c) predicting whether or not overheating occurs for each shift clutch by comparing the derived predicted temperature value of the friction element for each shift clutch with an allowable temperature set for each shift clutch; and (d) determining a target shift stage while avoiding the overheating clutch with a predicted temperature value exceeding the allowable temperature, through switching to an avoidance shift mode.

In certain preferred aspects, the information required to predict the friction element temperature for each shift clutch may include some or all of the rotation speed of an oil pump or a torque converter turbine, an oil temperature, a current shift stage, an oil supply flow rate for each shift clutch, the rotation speeds of a clutch hub and a clutch drum for each shift clutch corresponding to the rotation speed of the turbine, and a target hydraulic pressure for each shift clutch.

Preferably, in step (b), the predicted temperature value of the friction element for each shift clutch may be derived by determining the rotation speed and relative speed of the clutch hub and the clutch drum for each shift clutch corresponding to the current turbine rotation speed from the clutch speed map set by the relationship between the rotation speed of the turbine and the clutch hub and the clutch drum for each shift clutch, determining the current rotation speed of the oil pump or the turbine rotation speed and the oil temperature, and the oil supply flow rate for each shift clutch corresponding to the current shift stage using an oil flow rate map, determining an estimated transmission torque for each shift clutch using a clutch torque map, which uses the piston acting pressure derived from the target hydraulic pressure for each shift clutch and the rotational inertia of the friction element as factors, deriving a heating value of the friction element for each shift clutch using a heating value map set by the relationship between the estimated transmission torque for each shift clutch and the relative speed between a clutch hub and the clutch drum, and finally determining the predicted temperature value of the friction element for each shift clutch corresponding to the oil supply flow rate for each shift clutch and the heating value of the friction element for each shift clutch using a friction element temperature map set by the relationship between the heating value of the friction element for each shift clutch and the oil supply flow rate for each shift clutch.

In certain preferred aspects, when the mode switches to the avoidance shift mode, upon input of a shift command, the target shift stage may be determined while avoiding the shift clutch recognized as the overheating clutch.

The control method may also include:

(e) determining whether to take additional protective measures by comparing the predicted temperature value of the friction element with a reference temperature obtained by adding a specific value to the current oil temperature in a state in which the avoidance shift mode is switched; and (f) determining a final target hydraulic pressure for the target shift stage.

Preferably, if, as a result of the comparison through step (e), the predicted temperature value of the friction element is equal to or greater than the reference temperature, in step (f), the final target hydraulic pressure for the target shift stage may be derived after the protective measure for additionally limiting an engine torque is taken to protect the friction element. Further, when the predicted temperature value of the friction element is less than the reference temperature, in step (f), the final target hydraulic pressure for the target shift stage may be directly derived without the protective measure for additionally limiting an engine torque being taken to protect the friction element.

In certain aspects, the additional engine torque limitation for the protection of the friction element may be implemented by the process of determining the limited torque corresponding to the predicted temperature value of the friction element for each shift clutch and the current oil temperature using a torque limitation map in which different torque limitation values are stored according to the predicted temperature value of the friction element and the oil temperature, and controlling the engine output so as not to exceed the determined limited torque.

In addition, the final target hydraulic pressure may be derived by adding a hydraulic pressure compensation value determined in a hydraulic compensation map having an oil temperature, a throttle opening rate (%), a coolant temperature, and load as factors to a base hydraulic pressure value determined according to the engine torque.

In another aspect, there is provided a system for controlling clutch friction elements of an automatic transmission, the system including:

a data storage unit configured to store information about shift clutches;

a data collection unit configured to collect information required to predict a temperature of a friction element for each shift clutch; and a transmission control unit (TCU) configured to perform transmission control utilizing the information about the shift clutches and the information required to predict the friction element temperature, the TCU including;

a plurality of processors programmed to predict overheating of the friction element for each shift clutch through the prediction of the temperature of the friction element for each shift clutch utilizing the information about the shift clutches and the information required to predict the temperature of the friction element, and to control the shifting while avoiding the shift clutch that is predicted to be overheated.

Preferably, the plurality of processors may include: a predicted temperature deriving part configured to derive a predicted temperature value of a friction element for each shift clutch by using the information about the shift clutches and the information required to predict the temperature of the friction element; an overheating determination part configured to predict whether or not overheating occurs for each shift clutch by comparing the derived predicted temperature value of the friction element for each shift clutch with an allowable temperature set for each shift clutch; a protection logic operation part having an avoidance shift logic configured to recognize the shift clutch that is predicted to be overheated as an overheating clutch and determine a shift stage while avoiding the shift clutch recognized as the overheating clutch; and a hydraulic pressure control part configured to derive a final target hydraulic pressure for shifting to a target shift stage and perform transmission control on the basis of the derived final target hydraulic pressure.

In certain aspects, the predicted temperature deriving part may derive the predicted temperature value of the friction element for each shift clutch by determining the rotation speed and relative speed of the clutch hub and the clutch drum for each shift clutch corresponding to the current turbine rotation speed from the clutch speed map set by the relationship between the rotation speed of the turbine and the clutch hub and the clutch drum for each shift clutch, determining the current rotation speed of the oil pump or the turbine rotation speed and the oil temperature, and the oil supply flow rate for each shift clutch corresponding to the current shift stage using an oil flow rate map, determining an estimated transmission torque for each shift clutch using a clutch torque map, which uses the piston acting pressure derived from the target hydraulic pressure for each shift clutch and the rotational inertia of the friction element as factors, deriving a heating value of the friction element for each shift clutch using a heating value map set by the relationship between the estimated transmission torque for each shift clutch and the relative speed between a clutch hub and the clutch drum, and finally determining the predicted temperature value of the friction element for each shift clutch corresponding to the oil supply flow rate for each shift clutch and the heating value of the friction element for each shift clutch using a friction element temperature map set by the relationship between the heating value of the friction element for each shift clutch and the oil supply flow rate for each shift clutch.

In addition, the protection logic operation part may further include a torque limiting logic that is configured to compare the predicted temperature value of the friction element with a reference temperature obtained by adding a specific value to the current oil temperature, and when the predicted temperature value of the friction element is equal to or greater than the reference temperature, to additionally limit an engine torque to protect the friction element.

One or more the above steps and configurations may be carried out through use of a processor or control unit.

In a further aspect of the present disclosure, there is provided an automatic transmission vehicle including the control system for protecting a clutch friction element of an automatic transmission according to the aspect of the present disclosure.

In certain additional aspects, the overheating of the shift clutches, more specifically, the overheating of the clutch friction elements, is predicted in real time on the basis of various pieces of information collected from each part of a vehicle. Then, when the overheating is predicted in the friction element of a specific shift clutch, the overheating and damage resulting therefrom of the specific shift clutch can be reliably prevented by performing predetermined control (avoidance shifting, engine torque limitation, etc.).

Other aspects are disclosed infra.

DETAILED DESCRIPTION

Hereinafter, exemplary embodiments of the present disclosure will be described in detail with reference to the accompanying drawings.

Terms used herein are used to merely describe specific embodiments, and are not intended to limit the present disclosure. As used herein, an element expressed as a singular form includes a plurality of elements, unless the context clearly indicates otherwise.

Further, it will be understood that the term "comprising" or "including" specifies the presence of a stated feature, number, step, operation, element, part, or combination thereof, but does not preclude the presence or addition of one or more other features, numbers, steps, operations, elements, parts, or combinations thereof.

Also, terms such as first, second, etc. may be used to describe various elements, but the elements should not be limited by the terms. The above terms are used only for the purpose of distinguishing one component from another.

In addition, terms such as " . . . part", " . . . unit", " . . . module", etc. described in the specification mean a unit that processes at least one function or operation, which may be implemented by hardware or software or a combination of hardware and software.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

In the description with referenced to the accompanying drawings, it is noted that like elements are denoted in the drawings by like reference symbols, and a repeated description for the same configuration will be omitted. Further, the detailed description of known functions and configurations that may obscure the gist of the present disclosure will be omitted.

The present disclosure is provided to predict the overheating of the shift clutches in real time on the basis of various pieces of information collected from each part of a vehicle, and when the overheating is predicted in a specific shift clutch, to protect the overheating and damage resulting therefrom of the specific shift clutch by performing predetermined control (avoidance shifting, engine torque limitation, etc.). The configuration of a control system for protecting a clutch friction element of an automatic transmission will be described with reference to FIG. 1.

Figure 1:
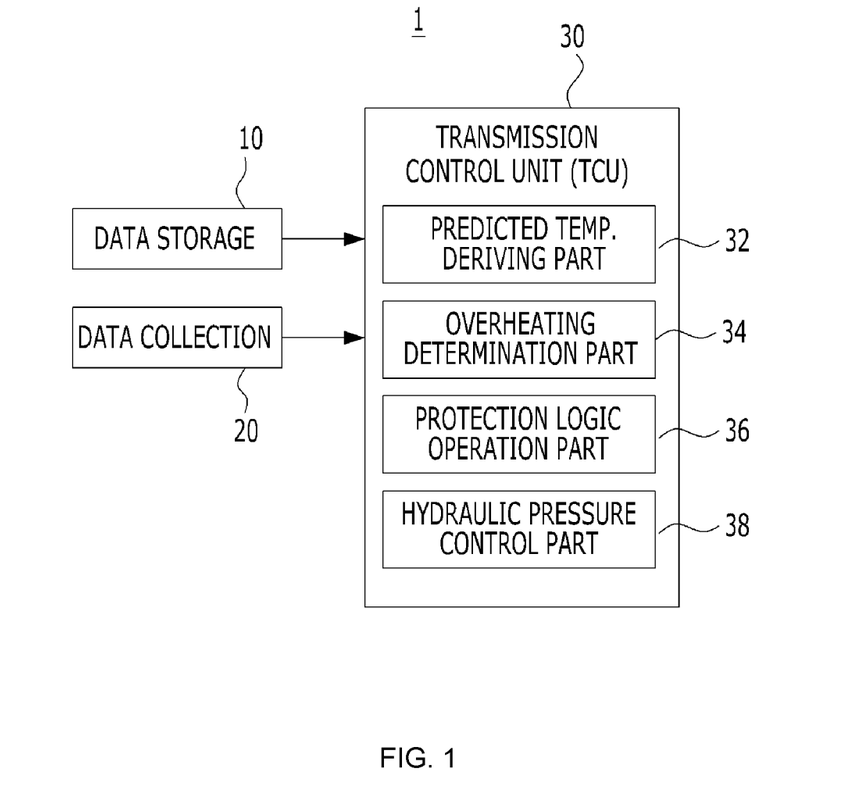
FIG. 1 is a block diagram schematically illustrating a system configuration of a control system for protecting a clutch friction element of an automatic transmission according to an embodiment of the present disclosure.

FIG. 1 is a block diagram schematically illustrating a system configuration of a control system for protecting a clutch friction element of an automatic transmission according to an embodiment of the present disclosure.

Referring to FIG. 1, a control system 1 for protecting a clutch friction element according to an embodiment of the present disclosure includes a data storage unit 10 configured to store information about a plurality of shift clutches constituting an automatic transmission, a data collection unit 20 configured to collect information required to predict a temperature of a friction element for each shift clutch, and a transmission control unit (TCU) 30 configured to control the transmission using the information about the shift clutches and the information required to predict the temperature of the friction element.

Here, the information about the shift clutches stored in the data storage unit 10 may be information about the overall clutch specification, such as the number of clutch friction elements (the number of clutch disks and clutch plates) and the diameter of the friction elements of each shift clutch, and an overlapping area of adjacent friction elements (of the clutch disk and clutch plate), that is, an actual friction area between adjacent friction elements. In addition, the information collected by the data collection unit 20 to predict the friction element temperature for each shift clutch may include some or all of the rotation speed of an oil pump or a torque converter turbine, an oil temperature, a current shift stage, an oil supply flow rate for each shift clutch, the rotation speeds of a clutch hub and a clutch drum for each shift clutch corresponding to the rotation speed of the turbine, and a target hydraulic pressure for each shift clutch.

The transmission control unit 30 is configured to predict overheating of the friction element for each shift clutch through the prediction of the temperature of the friction element for each shift clutch utilizing the information about the shift clutches and the information required to predict the temperature of the friction element, provided by the data storage unit 10 and the data collection unit 20, respectively. The transmission control unit includes a plurality of processors programmed to sequentially perform a series processes to control the shifting while avoiding the shift clutch that is predicted to be overheated.

The plurality of processors constituting the TCU 30 of the control system preferably include a predicted temperature deriving part 32 configured to derive a predicted temperature value of a friction element for each shift clutch, and an overheating determination part 34 configured to predict whether or not overheating occurs for each shift clutch by comparing the predicted temperature value of the friction element for each shift clutch with an allowable temperature set for each shift clutch.

In addition, the processors include a protection logic operation part 36 having an avoidance shift logic configured to recognize the shift clutch that is predicted to be overheated as an overheating clutch and determine a shift stage while avoiding the shift clutch recognized as the overheating clutch, and a hydraulic pressure control part 38 configured to derive a final target hydraulic pressure for shifting to a target shift stage and perform transmission control on the basis of the derived final target hydraulic pressure.

The predicted temperature deriving part 32 derives the predicted temperature value of the friction element for each shift clutch using the information about the shift clutches and the information required to predict the temperature of the friction element. In the predicted temperature deriving part 32, the process of deriving the predicted temperature value of the friction element for each shift clutch using the information about the shift clutches and the information required to predict the temperature of the friction element is as follows.

Process of Deriving Predicted Temperature of Friction Element for Each Shift Clutch 1. The determination of the rotation speed and relative speed of the clutch hub and the clutch drum for each shift clutch corresponding to the current turbine rotation speed from the clutch speed map set by the relationship between the rotation speed of the turbine and the clutch hub and the clutch drum for each shift clutch
2. The determination of the current rotation speed of the oil pump or the turbine rotation speed and the oil temperature, and the oil supply flow rate for each shift clutch corresponding to the current shift stage using an oil flow rate map
3. The determination of an estimated transmission torque for each shift clutch using a clutch torque map, which uses the piston acting pressure derived from the target hydraulic pressure for each shift clutch and the rotational inertia of the friction element as factors and the derivation of a heating value of the friction element for each shift clutch using a heating value map set by the relationship between the estimated transmission torque for each shift clutch and the relative speed between a clutch hub and the clutch drum
4. The final determination of the predicted temperature value of the friction element for each shift clutch corresponding to the oil supply flow rate for each shift clutch and the heating value of the friction element for each shift clutch using a friction element temperature map set by the relationship between the heating value of the friction element for each shift clutch and the oil supply flow rate for each shift clutch The information about the predicted temperature value of the friction element for each shift clutch derived by the predicted temperature deriving part 32 through the above series of processes is provided to the overheating determination unit 34, which determines whether or not the overheating occurs by comparing the predicted temperature value of the friction element for each shift clutch provided from the predicted temperature deriving part 32 with the allowable temperature set for each shift clutch (the reference value for determining overheating of the friction element for each shift clutch).

Specifically, when the predicted temperature value of the friction element for each shift clutch exceeds the correspondingly set allowable temperature (the reference value for determining overheating of the friction element for each shift clutch), the overheating determination part 34 determines (predicts) that the shift clutch having the predicted temperature value has been overheated. More precisely, when the predicted temperature value of the friction element exceeds the allowable temperature, it is predicted that excessive slip occurs in the corresponding shift clutch during shifting, resulting in overheating.

The determination information by the overheating determination part 34 is provided to the protection logic operation part 36. From the determination information provided by the overheating determination part 34, the protection logic operation part 36 recognizes the shift clutch, which is predicted to be overheated due to excessive slip during shifting, as an overheating clutch. Further, upon the reception of a shift request, the protection logic operation part determines a target shift stage while avoiding the shift clutch recognized as the overheating clutch, thereby preventing overheating of the clutch.

For example, in a situation in which a kick-down shift is required due to a sudden operation of an accelerator pedal during 8-stage driving and the target shift stage determined on a dedicated shift map from the current accelerator pedal depression amount and vehicle speed is 5-stage (8-stage, 5-stage), when the temperature of the shift clutch applied in changing the shift stage to 5-state exceeds the allowable temperature, the target shift stage is changed to 6-stage instead of 5-stage to avoid overheating of the corresponding shift clutch.

The protection logic operation part 36 also includes a torque limiting logic for additionally limiting an engine torque to protect a friction element. Here, the torque limiting logic may be programmed to compare the predicted temperature value of the friction element for each shift clutch with a reference temperature (e.g., oil temperature+5° C.) obtained by adding a specific value to the current oil temperature and, when the predicted temperature value of the friction element is equal to or greater than the reference temperature, to limit the engine torque to the set range.

On the other hand, when the target shift stage finally determined through the dedicated shift map set by the relationship between the pedal depression amount of the accelerator pedal and the vehicle speed, or the final target to be avoided by the protection logic operation part 36 is determined, the hydraulic pressure control part 38 derives the final target hydraulic pressure for shifting to the target shift stage, and controls the shift solenoid on the basis of the derived final target hydraulic pressure to implement the shifting.

Here, the final target hydraulic pressure may be derived by adding a hydraulic pressure compensation value determined in a hydraulic compensation map having an oil temperature, a throttle opening rate (%), a coolant temperature, and load as factors to a base hydraulic pressure value determined according to the engine torque. That is, the final target hydraulic pressure for shifting to the target shift stage may be determined as a value obtained by adding the hydraulic pressure compensation value to the base hydraulic pressure value.

A sequential control process for protecting a clutch friction element using the control system for protecting a clutch friction element of an automatic transmission according to an embodiment of the present disclosure will be described with reference to the control flowchart of FIG. 2. For convenience of description, the configuration illustrated in FIG. 1 will be described with reference to the corresponding reference numerals.

Figure 2:
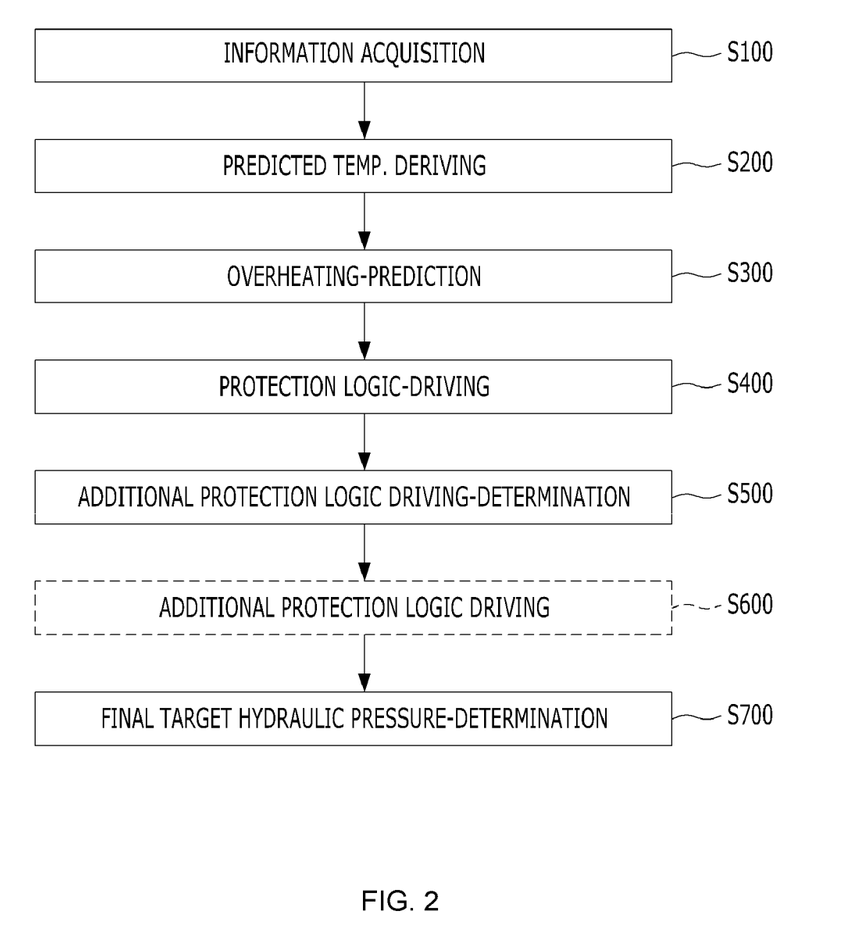
FIG. 2 is a flowchart schematically illustrating a control process for protecting a clutch friction element of an automatic transmission.
Figure 3:
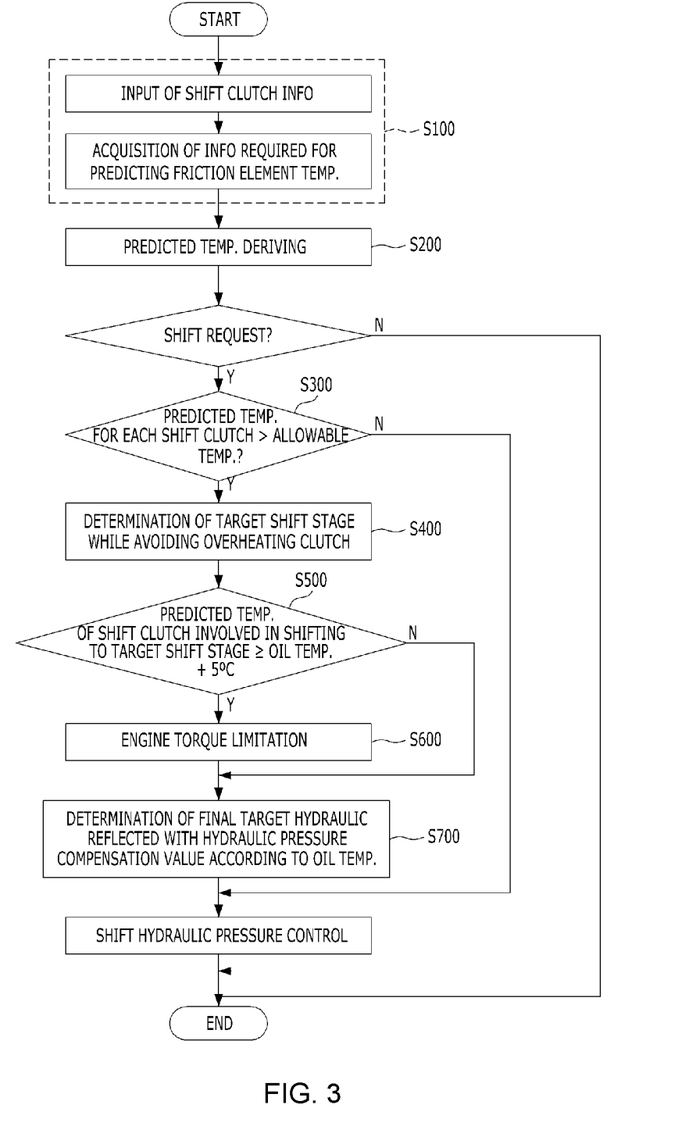
FIG. 3 is a control flowchart specifically illustrating a control process for protecting a clutch friction element of an automatic transmission.

FIG. 2 is a flowchart schematically illustrating a control process for protecting a clutch friction element of an automatic transmission, and FIG. 3 is a control flowchart specifically illustrating a control process for protecting a clutch friction element of an automatic transmission.

Referring to FIGS. 2 and 3, the control method for protecting the clutch friction element of the automatic transmission according to the embodiment of the present disclosure mainly includes information acquisition step S100, predicted temperature deriving step S200, overheating-prediction step S300, and protection logic driving step S400. In addition, the control method may further include additional protection logic driving-determining step S500, additional protection logic-driving step S600, and final target hydraulic pressure-determining step S700.

In the information acquisition step S100, information about the shift clutches is retrieved from the data storage unit 10 and information required to predict the temperature of the friction element for each shift clutch is acquired.

Here, the information about the shift clutches may be information about the overall clutch specification, such as the number of clutch friction elements (the number of clutch disks and clutch plates) and the diameter of the friction elements of each shift clutch, and an overlapping area of adjacent friction elements (of the clutch disk and clutch plate), that is, an actual friction area between adjacent friction elements.

In addition, the information required to predict the friction element temperature for each shift clutch may include some or all of the rotation speed of an oil pump or a torque converter turbine, an oil temperature, a current shift stage, an oil supply flow rate for each shift clutch, the rotation speeds of a clutch hub and a clutch drum for each shift clutch corresponding to the rotation speed of the turbine, and a target hydraulic pressure for each shift clutch.

In the predicted temperature deriving step S200, the predicted temperature value of the friction element for each shift clutch is derived using the information about the shift clutches and the information required to predict the temperature of the friction element, which is obtained in the information acquisition step S100. Since the detailed process of deriving the predicted temperature value of the friction element for each shift clutch in the predicted temperature deriving step S200 has already been described above, a redundant description will be omitted below.

In the overheating-prediction step S300, whether or not the overheating occurs for each shift clutch is predicted by comparing the predicted temperature value of the friction element for each shift clutch derived through the predicted temperature deriving step S200 with the allowable temperature (the reference value for determining overheating of the friction element for each shift clutch) set for each shift clutch. In the overheating prediction step S300, when the predicted temperature value exceeds the allowable temperature, it is predicted that the corresponding shift clutch will be overheated during the shift process.

When overheating is not predicted in any of the shift clutches in the overheating prediction step S300, that is, when the predicted temperature value is below the allowable temperature, the shift is implemented by performing hydraulic pressure control depending on the target shift stage determined on the shift map according to the pedal depression amount of the accelerator pedal and the vehicle speed without proceeding to an additional process, and when overheating is predicted in a specific shift clutch, a process proceeds to the protection logic driving step S400.

In the protection logic driving step S400, the operation mode switches to an avoidance shift mode in which an overheating clutch having the predicted temperature value exceeding the allowable temperature is avoided. Specifically, upon switching to the avoidance shift mode, when a shift command is input, the target shift stage is determined by avoiding the shift clutch recognized as an overheating clutch, thereby preventing overheating of the corresponding clutch (the clutch recognized as the overheating clutch) in advance.

For example, in a situation in which a kick-down shift is required due to a sudden operation of an accelerator pedal during 8-stage driving and the target shift stage determined on a dedicated shift map from the current accelerator pedal depression amount and vehicle speed is 5-stage (8-stage, 5-stage), when the temperature of the shift clutch applied in changing the shift stage to 5-state exceeds the allowable temperature, the target shift stage is changed to 6-stage instead of 5-stage to avoid overheating of the corresponding shift clutch.

In the additional protection logic operation-determination step S500, it is determined whether to take additional protection measures by comparing the predicted temperature value of the friction element with the reference temperature obtained by adding a specific value to the current oil temperature in the state in which the mode switches to the avoidance shift mode in the previous step S400. Here, the additional protection measures may be measures for protecting a friction element of the shift clutch involved in shifting the changed target shift stage through engine torque limiting.

As a result of the comparison through the additional protection logic driving-determination step S500, when the predicted temperature value of the friction element is equal to or greater than the reference temperature, after taking protection measures to additionally limit the engine torque to protect the friction element (additional protection logic driving step S600), a process proceeds to the final target hydraulic pressure determination step S700 of deriving the final target hydraulic pressure for the target shift stage.

At this time, in additionally limiting the engine torque for the protection of the friction element in the additional protection logic driving step S600, the limit torque corresponding to the predicted temperature value of the friction element for each shift clutch and the current oil temperature using a torque limit map in which different torque limit values are stored according to the predicted temperature value of the friction element and the oil temperature, and the engine output is controlled in cooperation with an ECU so as not to exceed the determined limit torque.

On the contrary, if, as a result of comparison through the additional protection logic operation determination step S500, the predicted temperature value of the friction element is less than the reference temperature, the final target hydraulic pressure for shifting to the target shift stage is directly derived without additional protection measures to limit the engine torque to protect the friction element. That is, step S600 is omitted and a process proceeds directly to step S700 from step S500.

Meanwhile, in the final target hydraulic pressure determination step S600, when the target shift stage is finally determined through the dedicated shift map or the final target shift stage to be avoided by the above-described protection logic operation part 36 is determined, the final target hydraulic pressure for shifting to the target shift stage is derived.

Here, the final target hydraulic pressure may be derived by adding a hydraulic pressure compensation value determined in a hydraulic compensation map having an oil temperature, a throttle opening rate (%), a coolant temperature, and load as factors to a base hydraulic pressure value determined according to the engine torque. That is, the final target hydraulic pressure for shifting to the target shift stage may be determined as a value obtained by adding the hydraulic pressure compensation value to the base hydraulic pressure value.

According to the embodiments of the present disclosure, the overheating of the shift clutches, more specifically, the overheating of the clutch friction elements, is predicted in real time on the basis of various pieces of information collected from each part of a vehicle. Then, when the overheating is predicted in the friction element of a specific shift clutch, the overheating and damage resulting therefrom of the specific shift clutch can be reliably prevented by performing predetermined control (avoidance shifting, engine torque limitation, etc.).

In the above detailed description of the present disclosure, only specific embodiments thereof have been described. However, it is to be understood that the present disclosure is not limited to the particular form recited in the detailed description, but rather, it is to be understood to cover all modifications and equivalents and substitutions falling within the spirit and scope of the present disclosure as defined by the appended claims.

The invention claimed is:

1. A method of controlling clutch friction elements of an automatic transmission, the method comprising:
   (a) retrieving information about shift clutches from a data storage unit and acquiring information required to predict a temperature of a friction element for each shift clutch;
   (b) deriving a predicted temperature value of a friction element for each shift clutch by using the information about the shift clutches and the information required to predict the temperature of the friction element;
   (c) predicting whether or not overheating occurs for each shift clutch by comparing the derived predicted temperature value of the friction element for each shift clutch with an allowable temperature set for each shift clutch;
   (d) determining a target shift stage while avoiding an overheating clutch with the predicted temperature value exceeding the allowable temperature, through switching to an avoidance shift mode;
   (e) determining whether to take additional protective measures by comparing the predicted temperature value of the friction element with a reference temperature obtained by adding a specific value to a current oil temperature in a state in which the avoidance shift mode is switched; and
   (f) determining a final target hydraulic pressure for the target shift stage.

2. The method according to claim 1, wherein the information required to predict the friction element temperature for each shift clutch includes some or all of a rotation speed of an oil pump or a torque converter turbine, an oil temperature, a current shift stage, an oil supply flow rate for each shift clutch, rotation speeds of a clutch hub and a clutch drum for each shift clutch corresponding to the rotation speed of the turbine, and a target hydraulic pressure for each shift clutch.

3. The method according to claim 1, wherein in step (b), the predicted temperature value of the friction element for each shift clutch is derived by:
   determining a rotation speed and relative speed of a clutch hub and a clutch drum for each shift clutch corresponding to a current turbine rotation speed from a clutch speed map set by a relationship between a rotation speed of a turbine and the clutch hub and the clutch drum for each shift clutch;
   determining a current rotation speed of an oil pump or the turbine rotation speed and an oil temperature, and an oil supply flow rate for each shift clutch corresponding to a current shift stage using an oil flow rate map;
   determining an estimated transmission torque for each shift clutch using a clutch torque map, which uses a piston acting pressure derived from a target hydraulic pressure for each shift clutch and a rotational inertia of the friction element as factors, and deriving a heating value of the friction element for each shift clutch using a heating value map set by a relationship between the estimated transmission torque for each shift clutch and the relative speed between the clutch hub and the clutch drum; and
   finally determining the predicted temperature value of the friction element for each shift clutch corresponding to the oil supply flow rate for each shift clutch and the heating value of the friction element for each shift clutch using a friction element temperature map set by a relationship between the heating value of the friction element for each shift clutch and the oil supply flow rate for each shift clutch.

4. The method according to claim 1, wherein when the mode switches to the avoidance shift mode, upon input of a shift command, the target shift stage is determined while avoiding the shift clutch recognized as the overheating clutch.

5. The method according to claim 1, wherein when the predicted temperature value of the friction element is equal to or greater than the reference temperature, the final target hydraulic pressure for the target shift stage is derived after a protective measure for additionally limiting an engine torque is taken to protect the friction element, and
   when the predicted temperature value of the friction element is less than the reference temperature, the final target hydraulic pressure for the target shift stage is directly derived without the protective measure for additionally limiting the engine torque being taken to protect the friction element.

6. The method according to claim 5, wherein the additional engine torque limitation for the protection of the friction element is implemented by determining a limited torque corresponding to the predicted temperature value of the friction element for each shift clutch and the current oil temperature using a torque limitation map in which different torque limitation values are stored according to the predicted temperature value of the friction element and an oil temperature, and controlling an engine output so as not to exceed the determined limited torque.

7. The method according to claim 5, wherein the final target hydraulic pressure is derived by adding a hydraulic pressure compensation value determined in a hydraulic compensation map having an oil temperature, a throttle opening rate (%), a coolant temperature, and load as factors to a base hydraulic pressure value determined according to the engine torque.

8. A system for controlling clutch friction elements of an automatic transmission, the system comprising:
   a data storage unit configured to store information about shift clutches;
   a data collection unit configured to collect information required to predict a temperature of a friction element for each shift clutch; and
   a transmission control unit (TCU) configured to perform transmission control utilizing the information about the shift clutches and the information required to predict the friction element temperature, the TCU comprising:

a plurality of processors programmed to predict overheating of the friction element for each shift clutch through the prediction of the temperature of the friction element for each shift clutch utilizing the information about the shift clutches and the information required to predict the temperature of the friction element, and to control shifting while avoiding a shift clutch that is predicted to be overheated, wherein the plurality of processors comprises:

a predicted temperature deriving part configured to derive a predicted temperature value of the friction element for each shift clutch by using the information about the shift clutches and the information required to predict the temperature of the friction element;

an overheating determination part configured to predict whether or not overheating occurs for each shift clutch by comparing the derived predicted temperature value of the friction element for each shift clutch with an allowable temperature set for each shift clutch;

a protection logic operation part having an avoidance shift logic configured to recognize the shift clutch that is predicted to be overheated as an overheating clutch and determine a shift stage while avoiding the shift clutch recognized as the overheating clutch; and a hydraulic pressure control part configured to derive a final target hydraulic pressure for shifting to a target shift stage and perform transmission control on the basis of the derived final target hydraulic pressure, wherein the predicted temperature deriving part derives the predicted temperature value of the friction element for each shift clutch by:

determining a rotation speed and relative speed of a clutch hub and a clutch drum for each shift clutch corresponding to a current turbine rotation speed from a clutch speed map set by a relationship between a rotation speed of a turbine and the clutch hub and the clutch drum for each shift clutch;

determining a current rotation speed of an oil pump or the turbine rotation speed and an oil temperature, and an oil supply flow rate for each shift clutch corresponding to a current shift stage using an oil flow rate map;

determining an estimated transmission torque for each shift clutch using a clutch torque map, which uses a piston acting pressure derived from a target hydraulic pressure for each shift clutch and a rotational inertia of the friction element as factors, and deriving a heating value of the friction element for each shift clutch using a heating value map set by a relationship between the estimated transmission torque for each shift clutch and the relative speed between the clutch hub and the clutch drum; and finally determining the predicted temperature value of the friction element for each shift clutch corresponding to the oil supply flow rate for each shift clutch and the heating value of the friction element for each shift clutch using a friction element temperature map set by a relationship between the heating value of the friction element for each shift clutch and the oil supply flow rate for each shift clutch.

9. The system according to claim 8, wherein the protection logic operation part further comprises a torque limiting logic that is configured to compare the predicted temperature value of the friction element with a reference temperature obtained by adding a specific value to a current oil temperature, and when the predicted temperature value of the friction element is equal to or greater than the reference temperature, to additionally limit an engine torque to protect the friction element.

10. An automatic transmission vehicle comprising the system for controlling clutch friction elements of the automatic transmission according to claim 8.

* * * * *